US012798106B2

(12) United States Patent
Hagihara et al.

(10) Patent No.: US 12,798,106 B2
(45) Date of Patent: Nov. 17, 2026

(54) PICKING SYSTEM

(71) Applicant: Hitachi, Ltd., Tokyo (JP)

(72) Inventors: Daisuke Hagihara, Tokyo (JP); Kiyoto Ito, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 8 days.

(21) Appl. No.: 19/109,599

(22) PCT Filed: Apr. 19, 2023

(86) PCT No.: PCT/JP2023/015558
§ 371 (c)(1),
(2) Date: Mar. 7, 2025

(87) PCT Pub. No.: WO2024/053150
PCT Pub. Date: Mar. 14, 2024

(65) Prior Publication Data

US 2026/0084312 A1 Mar. 26, 2026

(30) Foreign Application Priority Data

Sep. 8, 2022 (JP) ................................ 2022-142821

(51) Int. Cl.
*B25J 9/16* (2006.01)
*B25J 13/08* (2006.01)

(52) U.S. Cl.
CPC ........... *B25J 9/1697* (2013.01); *B25J 9/1612* (2013.01); *B25J 9/1653* (2013.01); *B25J 13/088* (2013.01)

(58) Field of Classification Search
CPC ...... B25J 9/1697; B25J 9/1612; B25J 9/1653; B25J 13/088; B25J 13/08
See application file for complete search history.

(56) References Cited

U.S. PATENT DOCUMENTS

2021/0114207 A1 4/2021 Ottnad et al.
2022/0016767 A1* 1/2022 Ku ........................ B25J 9/1697
(Continued)

FOREIGN PATENT DOCUMENTS

JP 2021-524385 A 9/2021
JP 2022-21147 A 2/2022
JP 2022-33660 A 3/2022

OTHER PUBLICATIONS

International Search Report (PCT/ISA/210) issued in PCT Application No. PCT/JP2023/015558 dated Jul. 11, 2023 with English translation (4 pages).
(Continued)

*Primary Examiner* — Adam R Mott
*Assistant Examiner* — Heather J Keniry
(74) *Attorney, Agent, or Firm* — Crowell & Moring LLP

(57) ABSTRACT

The present invention estimates a gripping position that is more likely to satisfy a handling condition even when it is difficult to perform shape model comparison. A picking system 1 comprises a picking robot 3 that grips and moves an article 7, and a control device 2 that controls the picking robot 3. The control device 2 comprises: an image input unit that receives image data of the article 7 acquired by a sensor 4; an element reliability evaluation unit that evaluates a plurality of element reliabilities indicating an index of grippability for each physical element of the article 7, on the basis of the image data; a gripping position estimation unit that estimates a gripping position of the picking robot 3 with respect to the article 7 on the basis of the plurality of element reliabilities; a handling information input unit that accepts handling information indicating a handling condition concerning movement and gripping of the article 7 to be gripped in the gripping position; and a recognition parameter estimation unit that estimates a recognition parameter that is
(Continued)

used for the estimation of the gripping position by the gripping position estimation unit, on the basis of the handling information.

8 Claims, 13 Drawing Sheets

(56) References Cited

U.S. PATENT DOCUMENTS

| | | | | |
|---|---|---|---|---|
| 2022/0332524 | A1* | 10/2022 | Matsuoka | B65G 47/917 |
| 2023/0256601 | A1* | 8/2023 | Ku | B25J 9/1605 700/250 |
| 2023/0264365 | A1* | 8/2023 | Maeda | B25J 15/08 700/253 |
| 2023/0398690 | A1* | 12/2023 | Lee | B25J 9/1689 |

OTHER PUBLICATIONS

Japanese-language Written Opinion (PCT/ISA/237) issued in PCT Application No. PCT/JP2023/015558 dated Jul. 11, 2023 with English translation (7 pages).

* cited by examiner

FIG. 4

287

| HANDLING CONDITION | | LARGE | MEDIUM | SMALL |
|---|---|---|---|---|
| TIME | PICK-PLACE (s) | T1 > | T1 TO T2 | T2 < |
| | UNTIL PLACING OPERATION (s) | T11 > | T11 TO T12 | T12 < |
| COLLISION | COLLISION PROBABILITY | P1 > | P1 TO P2 | P2 < |
| | MARGIN UPON COLLISION DETERMINATION (mm) | M1 > | M1 TO M2 | M2 < |
| SPEED | MAXIMUM SPEED (m/s) | V1 < | V1 TO V2 | V2 > |
| | MAXIMUM ACCELERATION ($m/s^2$) | A1 < | A1 TO A2 | A2 > |
| ACCURACY | DEVIATION (mm) | X1 > | X1 TO X2 | X2 < |

FIG. 5

288

| ARTICLE | ELEMENT | POSITION (PIXEL) | INDEX (VALUE) |
|---|---|---|---|
| A | PLANARITY | x, y | X1 |
| | | ··· | X2 |
| | | ··· | X3 |
| | | ··· | X4 |
| | | ··· | ··· |
| | DISTANCE FROM GEOMETRICAL CENTER | x, y | Y1 |
| | | ··· | Y2 |
| | | ··· | Y3 |
| | | ··· | Y4 |
| | | ··· | ··· |
| | HEIGHT | ··· | ··· |
| | NORMAL | | ··· |
| | PLANE OVERLAP | | ··· |
| | PLANE SHAPE | | ··· |
| | PLANE NORMAL | | ··· |
| B | PLANARITY | x, y | X11 |
| | | ··· | X12 |
| | | ··· | X13 |
| | | ··· | X14 |
| | | ··· | ··· |
| | ··· | ··· | ··· |

FIG. 6

290

| ARTICLE | HANDLING CONDITION | | HISTORY | DATE |
|---|---|---|---|---|
| A | TIME | PICK-PLACE (s) | LARGE | 2022/1/1 |
| | | UNTIL PLACING OPERATION (s) | LARGE | |
| | COLLISION | COLLISION PROBABILITY | MEDIUM | |
| | | MARGIN UPON COLLISION DETERMINATION (mm) | SMALL | |
| | SPEED | MAXIMUM SPEED (m/s) | LARGE | |
| | | MAXIMUM ACCELERATION ($m/s^2$) | MEDIUM | |
| | ACCURACY | DEVIATION (mm) | MEDIUM | |
| B | TIME | PICK-PLACE (s) | SMALL | 2022/1/5 |
| | | UNTIL PLACING OPERATION (s) | SMALL | |
| | COLLISION | COLLISION PROBABILITY | MEDIUM | |
| | | MARGIN UPON COLLISION DETERMINATION (mm) | LARGE | |
| | SPEED | MAXIMUM SPEED (m/s) | MEDIUM | |
| | | MAXIMUM ACCELERATION ($m/s^2$) | MEDIUM | |
| | ACCURACY | DEVIATION (mm) | LARGE | |

FIG. 7

291

| PICKING ROBOT | PERFORMANCE | | VALUE |
|---|---|---|---|
| 3-1 | OPERATION TIME | PICK-PLACE (s) | a1 |
| | | UNTIL PLACING OPERATION (s) | b1 |
| | SPEED | MAXIMUM SPEED (m/s) | c1 |
| | | MAXIMUM ACCELERATION ($m/s^2$) | d1 |
| | ACCURACY | DEVIATION (mm) | e1 |
| | SIZE OF HAND | TOTAL LENGTH (mm) | f1 |
| | GRIP FORCE | GRIP STRENGTH (kg) | g1 |
| 3-2 | OPERATION TIME | PICK-PLACE (s) | a2 |
| | | UNTIL PLACING OPERATION (s) | b2 |
| | SPEED | MAXIMUM SPEED (m/s) | c2 |
| | | MAXIMUM ACCELERATION ($m/s^2$) | d2 |
| | ACCURACY | DEVIATION (mm) | e2 |
| | SIZE OF HAND | TOTAL LENGTH (mm) | f2 |
| | GRIP FORCE | GRIP STRENGTH (kg) | g2 |

FIG. 8

292

| ARTICLE | ELEMENT | VALUE/DEFINITION |
|---|---|---|
| A | FLEXIBILITY | $\alpha 1$ |
| | STRENGTH | $\beta 1$ |
| | WEIGHT | ··· |
| | SHAPE | COLUMN |
| B | FLEXIBILITY | $\alpha 1$ |
| | STRENGTH | $\beta 1$ |
| | WEIGHT | ··· |
| | SHAPE | ··· |

FIG. 12

| ELEMENT | CHARACTERISTIC |
|---|---|
| PLANARITY | AS IT BECOMES HIGHER, CLOSER TO PLANE AND LARGER ABSORPTION POWER |
| DISTANCE FROM GEOMETRICAL CENTER | AS IT BECOMES SMALLER, ENHANCED STABILITY AND LESS ARTICLE DEFORMATION AFTER GRIPPING |
| HEIGHT | AS IT BECOMES HIGHER, LESS INTERFERENCE WITH OTHER ARTICLES |
| NORMAL | AS IT GETS CLOSER TO VERTICAL DIRECTION, EASIER ENTRY OF HAND |
| PLANE OVERLAP | PRIORITIZE PLANE FREE FROM OVERLAP WITH OTHER ARTICLES |
| PLANE SHAPE | AS IT BECOMES CLOSER TO RECTANGULAR SHAPE, HIGHER PROBABILITY OF SINGLE ARTICLE/NO OVERLAP (DEPENDENT ON ARTICLE TYPE) |
| PLANE NORMAL | AS IT GETS CLOSER TO VERTICAL DIRECTION, EASIER ENTRY OF HAND |

PICKING SYSTEM

TECHNICAL FIELD

The present invention relates to a technique to perform operations for picking a picking target (article) using a picking robot. Specifically, the present invention relates to a technique for estimating a grip position at which the picking robot grips the picking target.

BACKGROUND ART

On the logistics site and the production site, articles are moved and transported as a part of processes of logistics and production. Recently, for example, in the logistics site such as the distribution warehouse, a picking robot has been employed for performing picking operations to take a specified article from many articles in storage. It is essential for the picking operation to estimate the grip position of the picking robot.

Patent Literature 1 has been proposed as the technique for estimating the grip position. The task set by Patent Literature 1 is to "attain accurate determination of the grip position at which the article is gripped by the grip device". Patent Literature 1 discloses the grip system (1) including "the acquisition unit (111) for acquiring images that include the object as an image pickup object, the estimation unit (112) for estimating a plurality of candidates for the grip position of the article using the estimation model (221) as the input image, and the determination unit (113) for determining the grip position at which the object is gripped by the grip device (30) with reference to those candidates for the grip position".

CITATION LIST

Patent Literature

Patent Literature 1: Japanese Unexamined Patent Application Publication No. 2022-21147

SUMMARY OF INVENTION

Technical Problem

In the picking operation, it is necessary to consider not only success in gripping but also guarantee of accuracy, safety, and efficiency of the picking operation. For example, it is desirable to protect the picking target from flaw, improve stowage accuracy, and attain speedy transport work. Handling conditions indicating conditions for gripping the picking robot become important to achieve the objectives. The picking operations that satisfy the handling conditions to achieve the objectives depend on the grip position of the picking robot. Accordingly, it is required to estimate the grip position that can readily satisfy the handling conditions.

If the shape model collation is available, a plurality of grip positions are preliminarily set with respect to the shape model so that such position is switchable in accordance with the handling condition. If it is difficult to make the shape model collation available, the grip positions cannot be preliminarily taught. Addition of the post-processing in accordance with the handling condition is known. However, this may enormously increase man-hours for manual adjustment of relevant parameters.

It is an object of the present invention to solve the problem by estimating the grip position that can readily satisfy the handling conditions even in the case where it is difficult or impossible to make the shape model collation available.

Solution to Problem

In order to solve the above-described problem, the present invention aims at estimating the recognition parameter to be used for estimating the grip position based on the handling information indicating the handling condition. More specifically, the picking system that performs an operation for picking an article as a picking target includes a picking robot that grips and moves the article, and a controller for controlling the picking robot. The controller includes an image input unit for receiving image data of the article, which have been acquired by a sensor, an element reliability evaluation unit for evaluating a plurality of element reliability degrees each indicating an index of gripping capability of the article for each physical element based on the image data, a grip position estimation unit for estimating a grip position of the picking robot that picks the article based on the plurality of element reliability degrees, a handling information input unit for receiving handling information indicating handling conditions concerning movement and gripping of the article to be gripped at the grip position, and a recognition parameter estimation unit for estimating a recognition parameter to be used for estimating a grip position by the grip position estimation unit based on the handling information. The picking robot is operated using the grip position estimated by the controller.

The present invention includes an apparatus that constitutes the picking system, and a sub-system formed by combining a part of the apparatus. The present invention further includes a picking method using the above-described structures, and the assisting method. The present invention further includes the program that allows the controller constituting the picking system to function as the computer, and the storage medium that stores the program.

Advantageous Effects of Invention

The present invention allows estimation of the grip position that can readily satisfy the handling condition of the picking operation even in the case where it is difficult or impossible to make the shape model collation available.

BRIEF DESCRIPTION OF DRAWINGS

FIG. 4 is a view representing handling information to be used for an embodiment of the present invention.

FIG. 5 is a view schematically representing reliability data to be used for an embodiment of the present invention.

FIG. 6 is a view representing history information to be used for an embodiment of the present invention.

FIG. 7 is a view representing hardware information to be used for an embodiment of the present invention.

FIG. 8 is a view representing article property information to be used for an embodiment of the present invention.

FIG. 12 is a list indicating a concept of a reliability degree according to an embodiment of the present invention.

DESCRIPTION OF EMBODIMENTS

Figure 1:
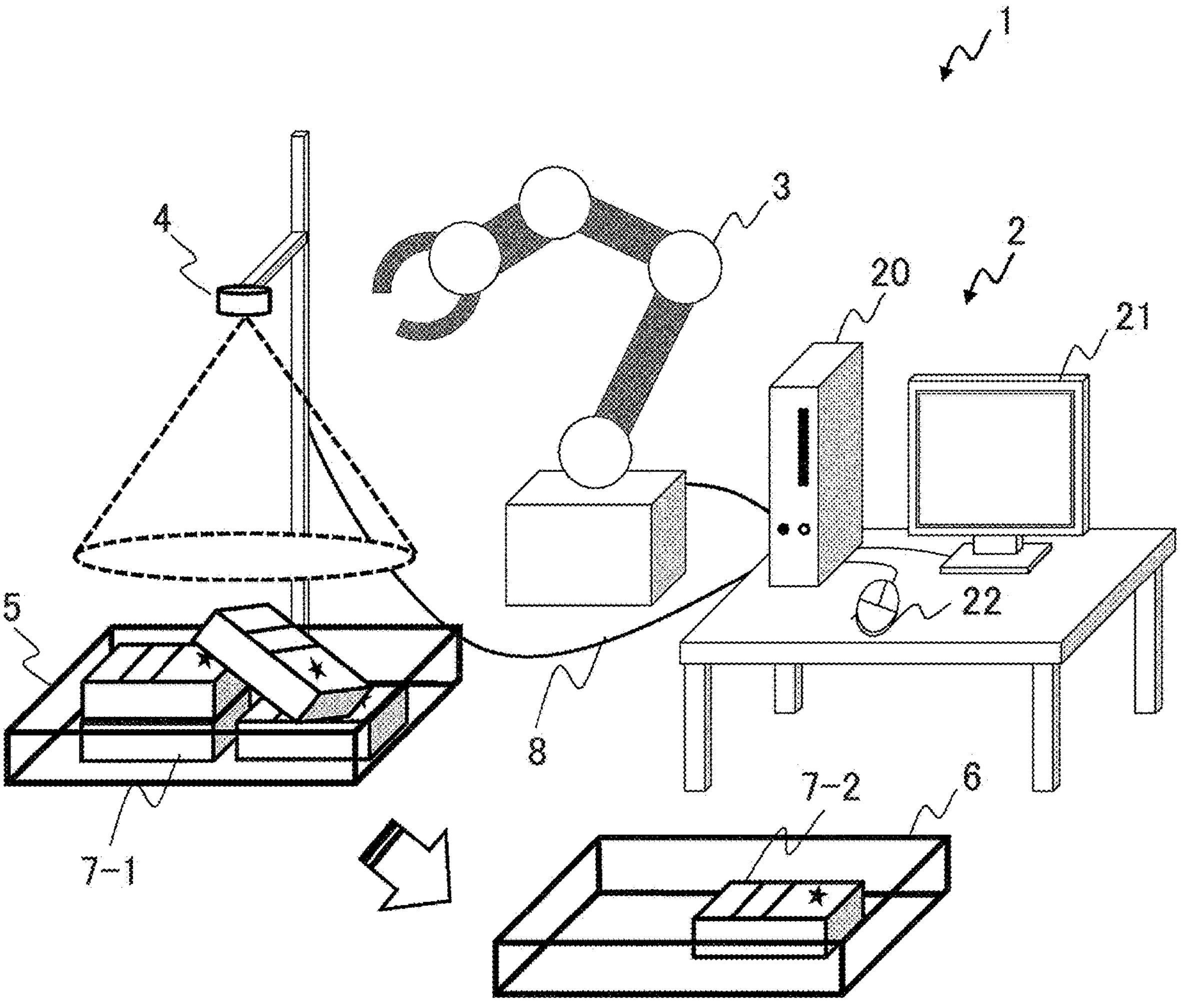
FIG. 1 is an outer appearance view of a picking system according to an embodiment of the present invention.

Referring to the drawings, an embodiment according to the present invention will be described. The present embodiment is exemplified by a picking system that grips an article loaded in a container, and moves the article to another container.

The present embodiment is applicable to the logistics base such as a warehouse, and factories. Locations of those sites, however, are not restricted.

FIG. 1 is an outer appearance view of a picking system 1 according to the present embodiment. Referring to FIG. 1, the picking system 1 includes a controller 2, a picking robot 3, and a sensor 4. A pick source container 5 loaded with an article 7-1 as a picking target, and a pick destination container 6 are placed near the picking system 1. The picking robot 3 moves the article 7-1 from the pick source container 5 to the pick destination container 6.

The pick destination container 6 is then loaded with an article 7-2. Based on image data of the article 7-1 picked up by the sensor 4, the picking robot 3 performs a picking operation, that is, grips and moves the article 7-1 in accordance with a control signal generated by the controller 2. Accordingly, the controller 2 is connected to the picking robot 3 and the sensor 4 via a channel 8. The respective devices will be described hereinafter. In the following description, if articles before/after movement are not distinguished from each other, a reference numeral 7 is given to those articles. If they are distinguished, the reference numeral 7-1 is given to the article before movement, and the reference numeral 7-2 is given to the article after movement.

The controller 2 can be implemented by a so-called computer including a main body 20, a display 21, and an input device 22. The main body 20 has a function for controlling the picking robot 3. Functions of the controller 2 will be described mainly regarding the main body 20.

Figure 2:
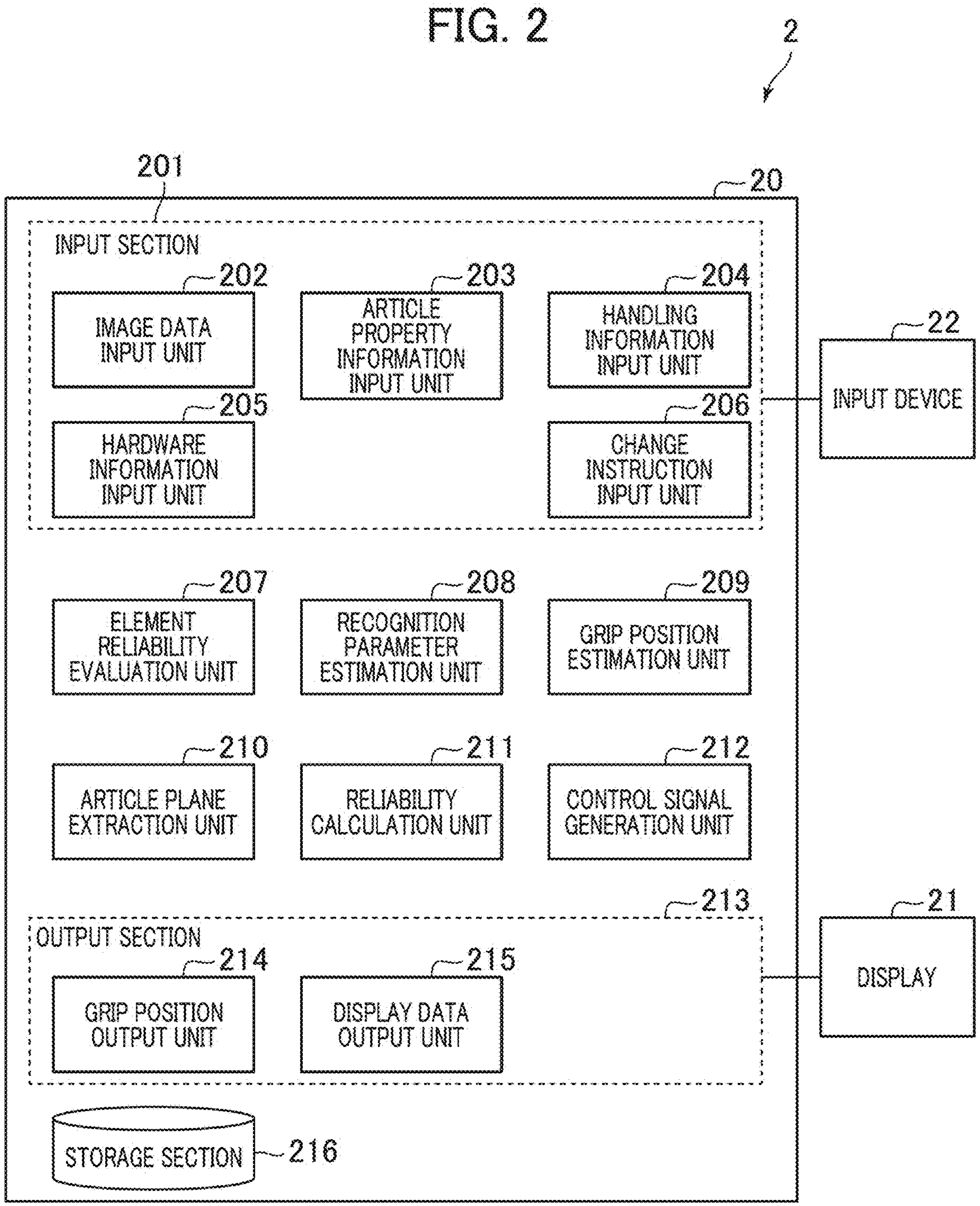
FIG. 2 is a functional block diagram of a controller according to an embodiment of the present invention.

FIG. 2 is a functional block diagram of a controller 2 according to the present embodiment. Referring to FIG. 2, the controller 2 includes the main body, the display 21 and the input device 22. The main body 20 as a main part of the present embodiment includes an input section 201, an element reliability evaluation unit 207, a recognition parameter estimation unit 208, a grip position estimation unit 209, an article plane extraction unit 210, a reliability calculation unit 211, a control signal generation unit 212, an output section 213, and a storage section 216.

The input section 201 receives information and data, which are used for generating control signals. The input section 201 includes an image data input unit 202, an article property information input unit 203, a handling information input unit 204, a hardware information input unit 205 and a change instruction input unit 206. The image data input unit 202 receives an input of image data picked up by the sensor 4. The image data includes an image of the article 7. The image data are in the form of, for example, gray scale images, RGB images, Depth images, and a three-dimensional point group.

The article property information input unit 203 receives article property information 292 relating to the property of the article 7. The handling information input unit 204 receives handling information 287 indicating handling conditions. The hardware information input unit 205 receives hardware information 291 indicating characteristics of the picking robot 3. The change instruction input unit 206 receives a change instruction for correcting and changing the handling information 287. This is the end of description of the input section 201.

The element reliability evaluation unit 207 evaluates gripping capability of the article 7 for each physical element, in other words, element reliability degree with respect to gripping easiness. That is, the element reliability evaluation unit 207 calculates the element reliability degree indicating an index of the gripping capability for each physical element. The recognition parameter estimation unit 208 estimates the recognition parameter to be used for estimating the grip position. The grip position estimation unit 209 estimates the grip position of the picking robot 3 for gripping the article 7-1 based on a plurality of element reliability degrees.

The article plane extraction unit 210 extracts a plane part of the article 7-1 from the image data received by the image data input unit 202. That is, the article plane extraction unit 210 has an article recognizing function that allows the controller 2 to function as an article recognition device. The extracted plane part may be used for estimating the grip position.

The reliability calculation unit 211 calculates a reliability degree relating to the gripping capability of the article 7-1 itself based on the element reliability. At this time, it is desirable that the reliability calculation unit 211 uses a weighting parameter indicating an importance given to each element reliability degree as the recognition parameter. Furthermore, it is desirable that the reliability calculation unit 211 integrates a plurality of element reliability degrees to calculate the reliability degree relating to the gripping capability of the article 7-1 itself. The integration in this case includes calculation of the total sum. The control signal generation unit 212 generates a control signal for controlling the picking operation of the picking robot 3 based on the grip position estimated by the grip position estimation unit 209. It is desirable that the control signal includes the estimated grip position.

Next, the output section 213 includes a grip position output unit 214 and a display data output unit 215. The grip position output unit 214 outputs at least the estimated grip position to the picking robot 3. The grip position output unit 214 may be configured to output the grip position by outputting the generated control signal to the picking robot 3. The display data output unit 215 outputs various types of information to the display 21 for displaying such information.

The display content will be described later. The storage section 216 accumulates information and data, which are used for processing to be executed by the respective units. The information and data will be described later.

The input device 22 receives a user's operation, and the input section 201 receives the operation content. It is desirable that the input section 201 is connected to the storage section 216 for receiving the information and data. The display 21 displays various types of information output by the display data output unit 215. For this, the display 21 can be implemented by a CRT display, an LCD (Liquid Crystal Display), and an organic EL (Electro-Luminescence) display. Furthermore, the input device 22 can be implemented by a pointing device such as a touch panel, a keyboard, and a mouse. Therefore, the display 21 and the input device 22 may be configured to be commonized like the touch panel. This is the end of description of FIG. 2. An implementation example of the controller 2 will be described.

Figure 3:
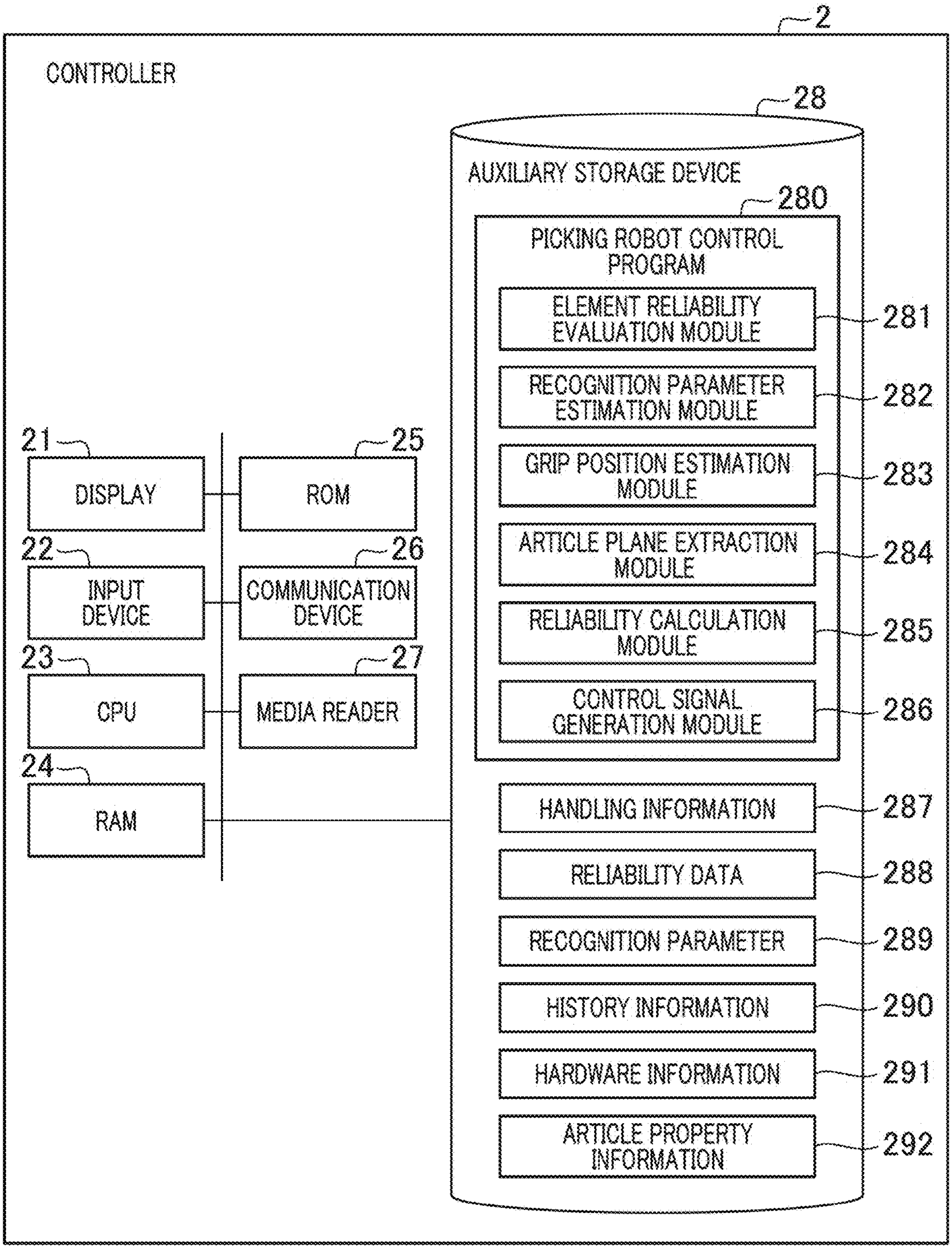
FIG. 3 shows a hardware configuration of a controller according to an embodiment of the present invention.

FIG. 3 shows a hardware configuration of a controller 2 according to the present embodiment. In the present embodiment, the controller 2 is implemented by the computer. Referring to FIG. 3, the controller 2 includes the display 21, the input device 22, CPU 23, RAM 24, a communication device 26, ROM 25, a media reader 27 and an auxiliary storage device 28. As the display 21 and the input device 22 have been already described, other structures will be described hereinafter.

The CPU (Central Processing Unit) 23 can be implemented by a so-called processor as a unit for executing the respective arithmetic operations. The CPU 23 performs various types of processing by executing a picking robot control program 280 loaded into the RAM 24 from the auxiliary storage device 28. The processing corresponds to the one to be executed by the units including the element reliability evaluation unit 207 to the control signal generation unit 212 as illustrated in FIG. 2. Details of the processing will be described later using the flowchart.

The picking robot control program 280 represents an application program executable on an OS (Operating System) program, for example. The picking robot control program 280 is composed of an element reliability evaluation module 281, a recognition parameter estimation module 282, a grip position estimation module 283, an article plane extraction module 284, a reliability calculation module 285, and a control signal generation module 286. The processing using the respective modules corresponds to the one to be executed by the units including the element reliability evaluation unit 207 to the control signal generation unit 212 as illustrated in FIG. 2. In the present embodiment, the picking robot control program 280 constituted by a plurality of modules for the respective functions may be implemented by a plurality of independent programs for the respective functions.

The picking robot control program 280 may be installed in the auxiliary storage device 28 from a portable type storage medium via the media reader 27, for example. That is, the picking robot control program 280 can be stored in the storage medium. The CPU 23 is allowed to execute the processing in accordance with the program other than the picking robot control program 280. In this case, it is desirable to store this program in the auxiliary storage device 28.

The RAM (Random Access Memory) 24 represents the memory that stores the program executed by the CPU 23 such as the picking robot control program 280, and data necessary for executing the program. The ROM (Read Only Memory) 25 represents the memory that stores the program and OS necessary for starting the controller 2. The communication device 26 is connected to the picking robot 3 and the sensor 4 via the channel 8. The channel 8 can be implemented by the network such as LAN (Local Area Network) and internet. The communication device 26 functions as the input section 201 and the output section 213 as illustrated in FIG. 2, and further functions as the interface connected to the display 21 and the input device 22.

The media reader 27 can be implemented by a device that reads information from a portable type storage medium with portability such as a flash memory and a CD-ROM. The auxiliary storage device 28 can be implemented by an HDD (Hard Disk Drive), for example, which stores data and program for executing various types of processing.

The auxiliary storage device 28 may be implemented by an SSD (Solid State Drive) using the flash memory. The RAM 24, the ROM 25, and the auxiliary storage device 28 all correspond to the storage section 216 as illustrated in FIG. 1. The auxiliary storage device 28 accumulates the above-described picking robot control program 280, and various types of information and data, which will be described below. Specifically, the auxiliary storage device 28 accumulates the handling information 287, reliability data 288, recognition parameters 289, history information 290, the hardware information 291, and the article property information 292. The respective information and data will be described hereinafter.

FIG. 4 is a view representing handling information 287 to be used for the present embodiment. The handling information 287 represents handling conditions relating to operations for picking the article 7, in other words, moving and gripping operations. In the present embodiment, the handling condition is defined in terms of items including the time taken for the picking operation, collision, speed, and accuracy. In this case, the time represents the time to be taken for the picking operation. In the present embodiment, the time taken for "pick-place" and the time taken "until placing operation" are used, each as the time. The term "pick-place" represents the time taken from gripping the article 7-1 in the pick source container 5 to placing the article into the pick destination container 6.

The term "until placing operation" represents the time taken from activation of the picking robot 3 to start of the movement.

The collision represents the item relating to collision that occurs in the picking operation. The present embodiment uses "collision probability" and "margin upon collision determination" as the collision. The "collision probability" represents the probability of collision of the article 7 or the picking robot 3 in the picking operation. The "margin upon collision determination" represents a reference distance of a collided object upon determination of the collision.

The speed represents the speed of the picking robot 3 in the picking operation, and the moving speed of the article 7 in association with the picking operation. The present embodiment uses "maximum speed" and "maximum acceleration" as the speed. The "maximum speed" represents the maximum speed of the picking robot 3 or the article 7 in the picking operation. The "maximum acceleration" represents the maximum acceleration of the picking robot 3 or the article 7 in the picking operation.

The accuracy represents the accuracy of the picking operation. The present embodiment uses a "deviation" as the accuracy. The deviation includes the one between a target position and an actual position of the picking robot 3 in operation, for example, the grip position and the placed position of the article 7-2.

As the respective items are mere examples, it is possible to use either a part of them, or other items. In the present embodiment, criteria with respect to the degree of consideration given to the respective items are recorded as handling conditions. Specifically, reference numerical values are recorded for each item with respect to "large", "medium", and "small". Taking the "pick-place" as an example, in the case of T1>, the degree of consideration corresponds to "large", in the case of T1 to T2, the degree corresponds to "medium", and in the case of T2<, the degree corresponds to "small". The degrees of consideration for those items, and the corresponding criteria are optional, and are omittable.

The reliability data 288 used in the present embodiment will be described. The reliability data 288 represents indexes of gripping capability, and index values corresponding to the image data at the respective positions. The position in this case can be expressed by pixels of the image data. As the reliability data 288, it is possible to use a two-dimensional heat map image representing a planarity degree at each pixel for the image data to be processed. FIG. 5 is a view schematically representing reliability data 288 to be used for the present embodiment. As described above, the reliability data 288 are expressed by the heat map images. FIG. 5 shows index values of the image data of the articles at the respective positions, which are schematically expressed by scalar values for understanding of the present embodiment. As FIG. 5 illustrates, as the reliability data 288 of the present embodiment, physical elements (elements) are used, which include the planarity degree, a distance from geometrical center, height, normal, plane overlap, plane shape, plane normal or whatever so long as such element allows identification of the index value at each position. As the use of those elements is a mere example, it is possible to use either a part of them or other items. The term "geometrical center" of the "distance from geometrical center" is defined with respect to the article plane of the image data of a reliability calculation target at each position. The article plane in this case is calculated by the article plane extraction unit 210.

The recognition parameter 289 represents the parameter to be used for estimating the grip position. Calculation of the recognition parameter 289 will be described later with reference to the flowchart.

FIG. 6 is a view representing history information 290 to be used for the present embodiment. The history information 290 indicates whether or not the above-described handling conditions have been satisfied in the past picking operation, that is, gripping and movement of the article 7. The history information 290 in the present embodiment identifies the specific degree of the handling condition satisfied in the past picking operation. Furthermore, in the present embodiment, the date of performing the picking operation is recorded as well.

FIG. 7 is a view representing hardware information 291 to be used for the present embodiment. The hardware information 291 represents characteristics of the picking robot 3. In the present embodiment, characteristics of the hardware information 291 are expressed in terms of performance in the picking operation. Especially, it is desirable to use the size of the hand and the grip force as performance besides the operation time, speed, and accuracy, which correspond to the above-described handling conditions.

FIG. 8 is a view representing article property information 292 to be used for the present embodiment. The article property information 292 relates to properties of the article 7. In the present embodiment, the article property information 292 has items including flexibility, strength, weight, and shape of the article as shown in FIG. 8. As the use of those elements is a mere example, it is possible to use either a part of them or other items.

This is the end of description of the information and data, which are used in the present embodiment. Referring back to FIG. 1, configuration of the picking system 1 according to the present embodiment will be described. As FIG. 1 illustrates, in accordance with a control signal of the controller 2, the picking robot 3 grips the article 7-1 in the pick source container 5, and moves the article to the pick destination container 6. The picking robot 3 has the hand that grips the article 7-1 for the above-described operation. The hand performs the gripping operation by an arbitrary gripping method. The gripping method may be implemented by adsorbing, holding, and clipping the article 7-1. An arm of the picking robot 3 is operated to move the article 7-1 gripped by the hand to the pick destination container 6.

The sensor 4 picks up an image of an area in the vicinity of the pick source container 5 as indicated by a broken line of FIG. 1 to acquire image pickup data. As a result, an image of the article 7-1 is also picked up by the sensor 4. The sensor 4 can be implemented by a device such as a camera that is capable of acquiring image data that allow confirmation of the shape of the article 7-1.

Referring to FIG. 1, the pick source container 5 is loaded with the article 7-1 as a target of the picking operation. The pick destination container 6 is loaded with the article 7-2 which has been moved from the pick source container 5. The article 7-1 or 7-2 may be loaded in an arbitrary place without being limited to the container. For example, the article may be placed on the loading space of a carrier or a shelf.

Figure 9:
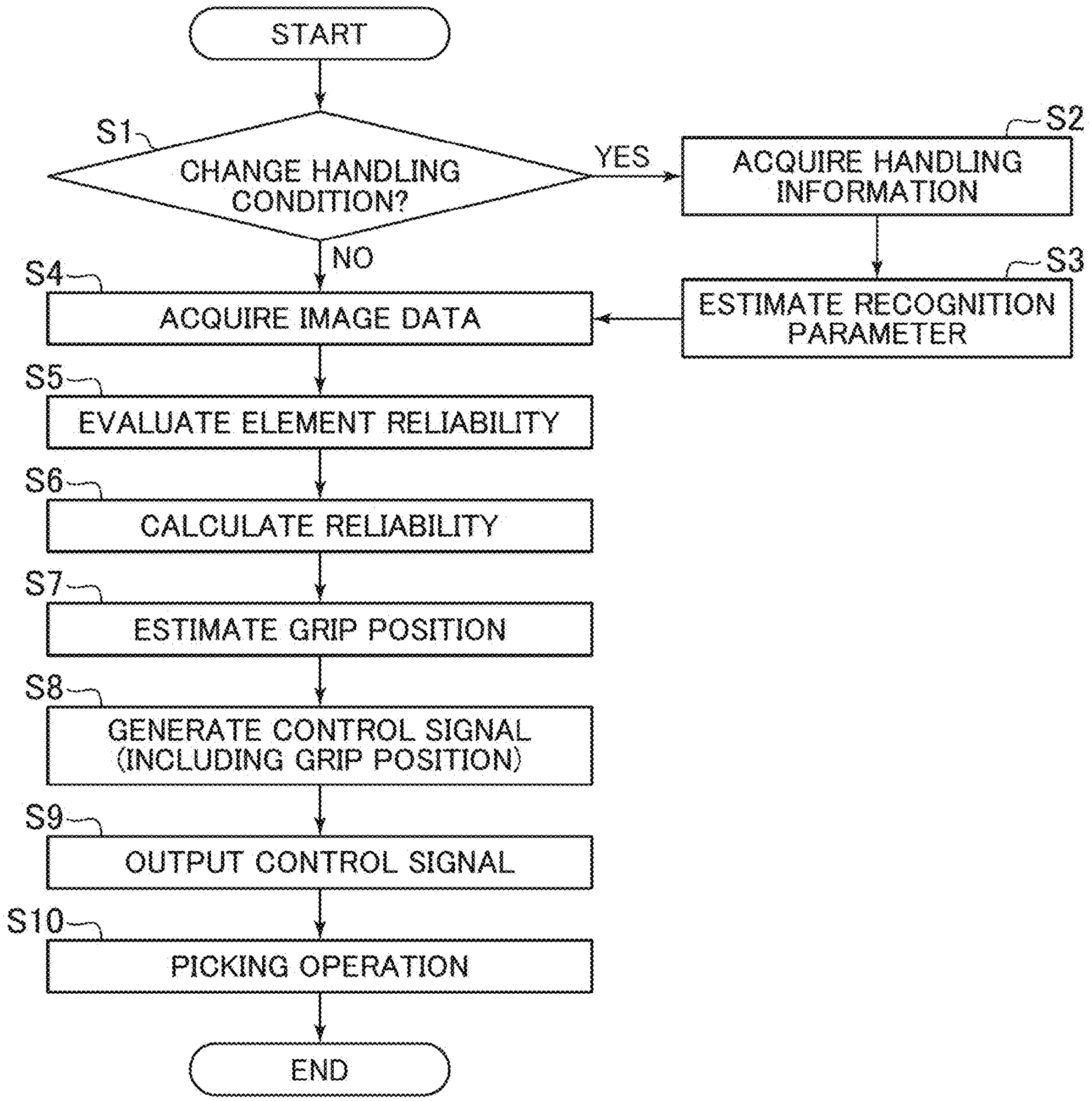
FIG. 9 is a flowchart representing a processing content according to an embodiment of the present invention.

This is the end of description of the configuration, and information/data according to the present embodiment. The content of processing to be executed in the present embodiment will be described. FIG. 9 is a flowchart representing a processing content according to the present embodiment. The processing executed by the controller 2 will be described as main processing using the respective components as illustrated in FIG. 2.

In step S1, the grip position estimation unit 209 of the controller 2 determines whether the handling condition of the handling information 287 has been changed. Therefore, the grip position estimation unit 209 may be configured to detect the change in the handling information 287 of the storage section 216, or configured to detect reception of a change instruction by the change instruction input unit 206. As a result, if the handling condition has been changed (Yes), the process proceeds to step S2. If the handling condition has not been changed (No), the process proceeds to step S4. The main processing in step S1 may be executed by other configurations such as the recognition parameter estimation unit 208, or by the input section 201.

In step S2, the handling information input unit 204 acquires the handling information 287 including the changed handling condition.

In step S3, the recognition parameter estimation unit 208 estimates the recognition parameter based on the acquired handling information 287. For example, the recognition parameter estimation unit 208 is capable of calculating the recognition parameter by a predetermined calculation formula using a variable as the degree of the handling condition of the handling information 287.

In step S4, the image data input unit 202 acquires the image data from the sensor 4. That is, the image data including the article 7-1, which have been picked up by the sensor 4 are acquired. The element reliability evaluation unit 207 that executes step S5 to be described later may be configured to capture the image data preliminarily accumulated in the storage section 216.

In step S5, the element reliability evaluation unit 207 evaluates (calculates) a plurality of element reliability degrees of the article 7-1 based on the acquired image data. The element reliability degree represents an index of gripping capability of the article 7-2 at each position (pixel) for each physical element. The article plane extraction unit 210 executes a pre-processing operation by processing image data for image recognition to identify the article 7-1. The physical element of the article 7-1 such as the plane is then extracted. The element reliability evaluation unit 207 estimates the numerical value indicating the physical element of the article 7-1 at each position (pixel). For example, the numerical value of the planarity degree is estimated.

The element reliability evaluation unit 207 evaluates the index (value) in accordance with the identified numerical value, that is, the element reliability degree. As a result, the element reliability evaluation unit 207 accumulates the element reliability degrees as indexes (values) of the reliability data 288 in the storage section 216.

In step S6, the reliability calculation unit 211 and the recognition parameter estimation unit 208 calculate the article reliability degree indicating the gripping capability of the article 7-1 itself using a plurality of element reliability degrees which have been evaluated in step S5. For example, the article reliability degree is calculated as described below.

(1) The recognition parameter estimation unit 208 receives the handling information 287, based on which the recognition parameter is calculated and output. The recognition parameter estimation unit 208 can be configured by machine learning as described below. This makes it possible to calculate more accurate recognition parameters.

(2) The reliability calculation unit 211 calculates the article reliability degree by integrating the element reliability degrees using the recognition parameter. For example, the article reliability degree is calculated to obtain Σ (element reliability degree×recognition parameter (weighting parameter)).

Figure 10:
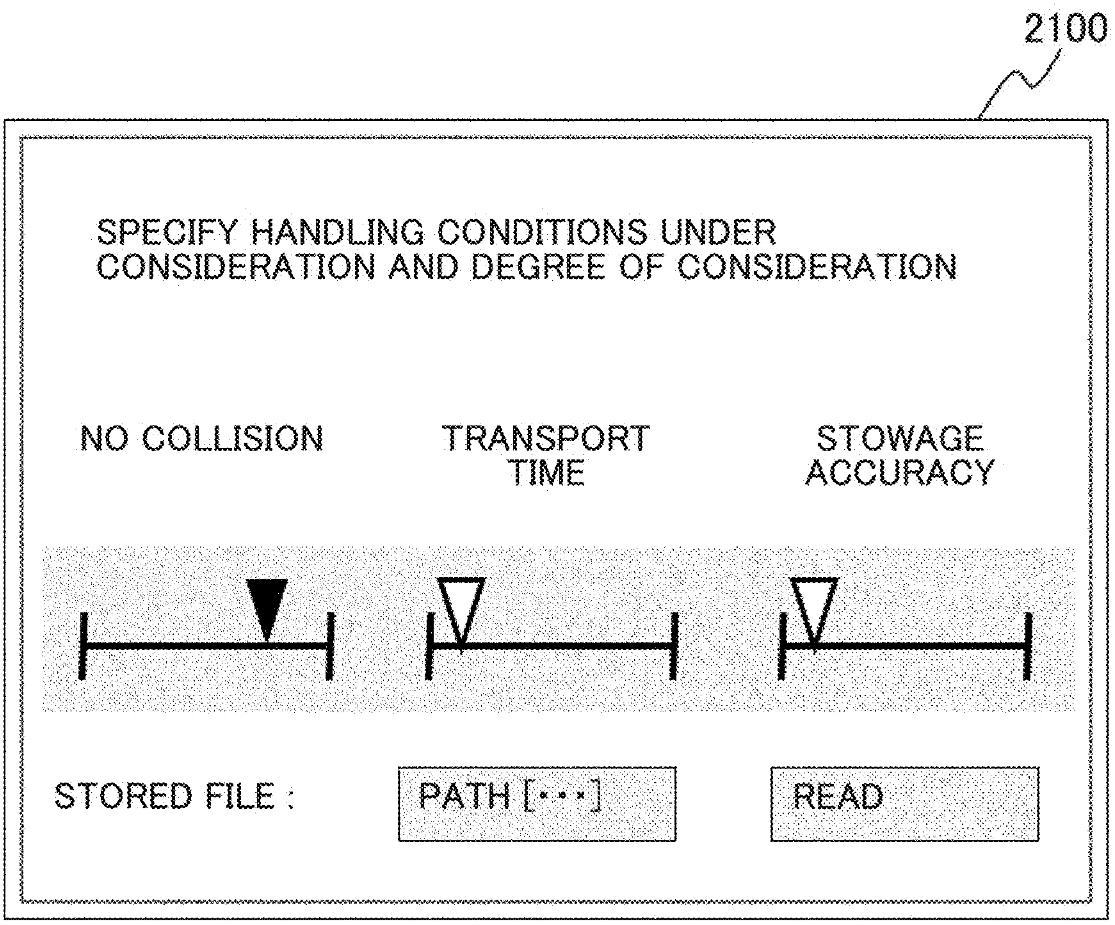
FIG. 10 is a view illustrating a screen of a display for inputting a weight according to an embodiment of the present invention.

The method for identifying the recognition parameter to be used for step (1) will be described. In the present embodiment, the recognition parameter is identified in accordance with the user's designation. The recognition parameter estimation unit 208 displays an input screen of the consideration degree with respect to the handling condition on the display 21 via the display data output unit 215. FIG. 10 illustrates a screen 2100 of the display 21 upon inputting of the consideration degree in the present embodiment. The screen 2100 displays sliders that allow inputs of the respective consideration degrees for specifications of the picking operation concerning the handling condition ("no collision", "transport time", "stowage accuracy").

The user designates the consideration degree indicating its importance through the input device 22. Specifically, as the slider position moves further to the right, more importance is given. The recognition parameter estimation unit 208 then identifies the numerical value corresponding to the slider position. The recognition parameter estimation unit 208 may be configured to change the numerical value of other specifications in accordance with movement of the slider. For example, if the importance is given to the "no collision" (moving to the right), each numerical value for the "transport time" and "stowage accuracy" is decreased correspondingly. This makes it possible to take a weighting balance among the respective specifications. As FIG. 10 illustrates, it is desirable to display the slider to be moved while being distinguished from other sliders.

The recognition parameter estimation unit 208 calculates the weighting parameter, that is, the recognition parameter based on the weight in accordance with the slider. In processing of step (2), the element reliability degree of the physical element is multiplied by the calculated numerical value of the recognition parameter. The total sum of the product is obtained to calculate the article reliability degree in step S6.

The recognition parameter estimation unit 208 can be configured as a parameter estimation unit. The recognition parameter estimation unit 208 can be configured by machine learning, in other words, accuracy improvement is attained. Specifically, the recognition parameter estimation unit records the recognition parameter value, and the degree how far the handling condition has been satisfied in the moving operation at the estimated grip point. Combinations of those values sufficient for learning are prepared as learning data for the recognition parameter estimation unit 208. The neural network learning is executed to reflect the relationship between the recognition parameter and the handling information 287 on the recognition parameter estimation unit, for example. As described above, execution of the cycle of estimating the grip position, collecting learning data, performing picking operations, and the model learning using learning data allows configuration of the recognition parameter estimation unit 208.

Furthermore, it is possible to manually configure the recognition parameter estimation unit 208. If the index of gripping capability is heuristic, the influence of the index on the handling condition is comprehensible. This makes it possible to manually configure the recognition parameter estimation unit 208. The content of such configuration will be described as below.

The higher the planarity degree at the grip position becomes, the higher the power to adsorb the article to be gripped becomes, thus allowing quick transport work. In this case, the recognition parameter of the planarity degree is increased to satisfy the requirement of making the speed restriction severe.

As the grip position gets closer to the area around the center of the article plane, the gripped article is less deformable to make the placing (transport) less difficult. Furthermore, the article 7-1 is unlikely to be detached from the hand, thus allowing quick transport work.

The recognition parameter at the center of the article 7-1 is increased to satisfy the requirement of making the stowage accuracy restriction severe. The recognition parameter at the center of the article 7-1 is increased to satisfy the requirement of making the time restriction severe.

As the height of the grip position is increased, the possibility that the article 7-1 exists under other articles is lowered, thus reducing the possibility of collision. The recognition parameter corresponding to the height is increased to satisfy the requirement of making the collision restriction severe.

As the normal direction of the grip position becomes closer to the vertical direction, the possibility that the article 7-1 or the hand collides with the pick source container 5 or the pick destination container 6 is lowered. The recognition parameter corresponding to the normal direction is increased to satisfy the requirement of making the collision restriction severe.

In step S7, based on the plurality of element reliability degrees, the grip position estimation unit 209 estimates the grip position at which the picking robot 3 grips the article 7-1 by using the article reliability degree calculated from the plurality of element reliability degrees. In this case, based on the article reliability degree of the article 7-1 at each position, the grip position estimation unit 209 estimates the grip position. For example, the position with the highest article reliability degree is estimated as the grip position. In the present embodiment, it is desirable that the position has a region of some extent without being limited to the point (coordinates) on the article 7-1. Especially, it is desirable that such region is in conformity with the hand size of the picking robot 3. For example, the region includes the adsorbing region of the hand.

Figure 11:
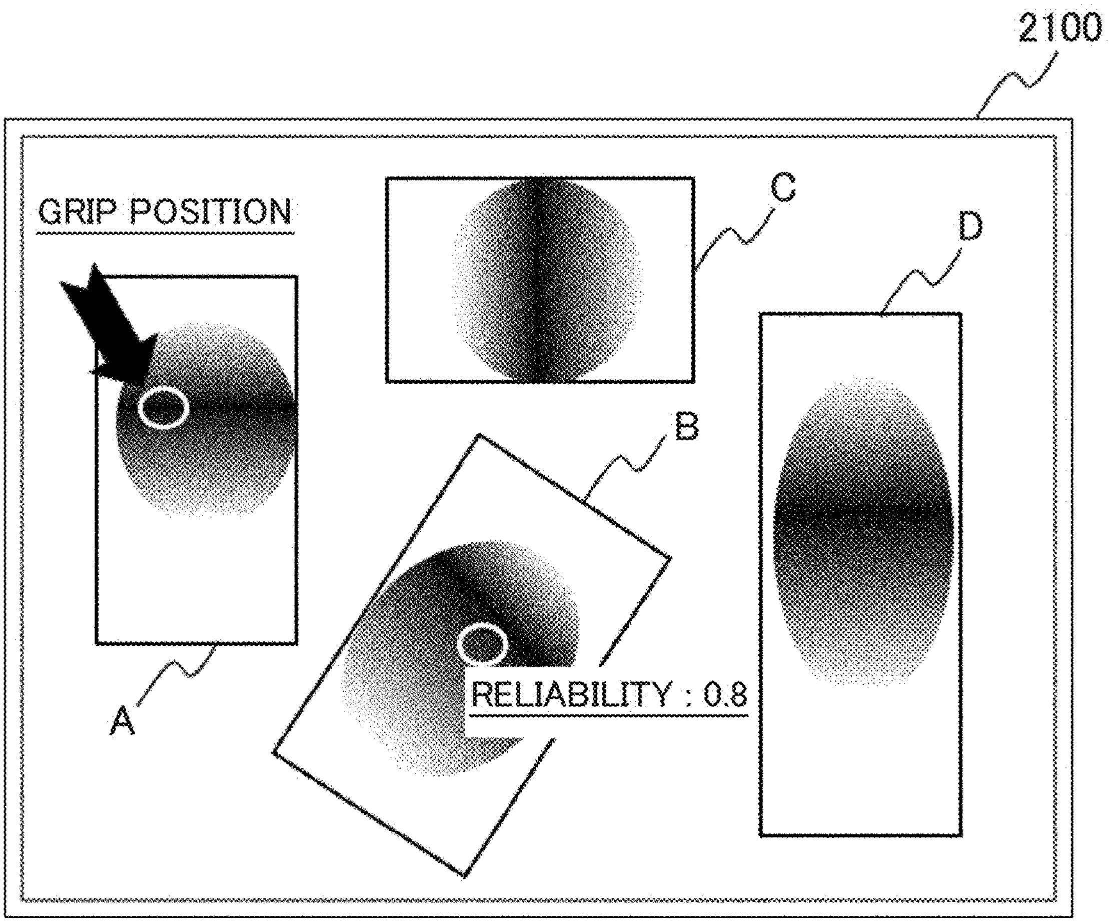
FIG. 11 is a view illustrating a screen of a display for displaying a grip position and an article reliability degree according to an embodiment of the present invention.

Desirably, the grip position estimation unit 209 displays the grip position and the article reliability degree on the display 21 via the display data output unit 215. FIG. 11 is a view illustrating the screen 2100 of the display 21 for displaying a grip position and an article reliability degree according to the present embodiment. Referring to FIG. 11, image data A to D corresponding to the plurality of articles 7-1 are displayed on the screen 2100. Each of the image data A to D is displayed, having the value of the article reliability degree expressed in gradation. Specifically, as the color gets darker, the article reliability degree becomes higher. Referring to the image data A of FIG. 11, the grip position estimated in this step is clearly indicated. It is also possible to display the article reliability degree at the position designated by the input device 22. This example is illustrated by the image data B of FIG. 11.

In step S8, the control signal generation unit 212 generates a control signal that includes the grip position estimated in step S7. The control signal may be generated in response to reception of a determination instruction to the screen 2100 as illustrated in FIG. 11 through the input device 22 of the user.

In step S9, the grip position output unit 214 having a control signal output function outputs the generated control signal to the picking robot 3. As a result, in step S10, the picking robot 3 performs the operation for picking the article 7-1 in accordance with the control signal. Specifically, the picking robot 3 moves its hand to the estimated grip position for gripping the article.

As described above, it is possible to estimate the grip position in accordance with the handling condition, and to perform the picking operation more accurately and efficiently. In the present embodiment, the grip position is estimated using the reliability degree (element reliability degree, article reliability degree). The concept of the reliability degree will be summarized. FIG. 12 is a list indicating a concept of a reliability degree according to the present embodiment. FIG. 12 shows characteristics of the respective physical elements. The characteristics relate to the gripping capability of the corresponding physical element. Based on the concept of the reliability degree, the present embodiment allows estimation of the more appropriate grip position in accordance with circumstances and needs. In the present embodiment, the grip position may be estimated using the information as shown in FIG. 12, which is stored in the storage section 216.

Figure 13:
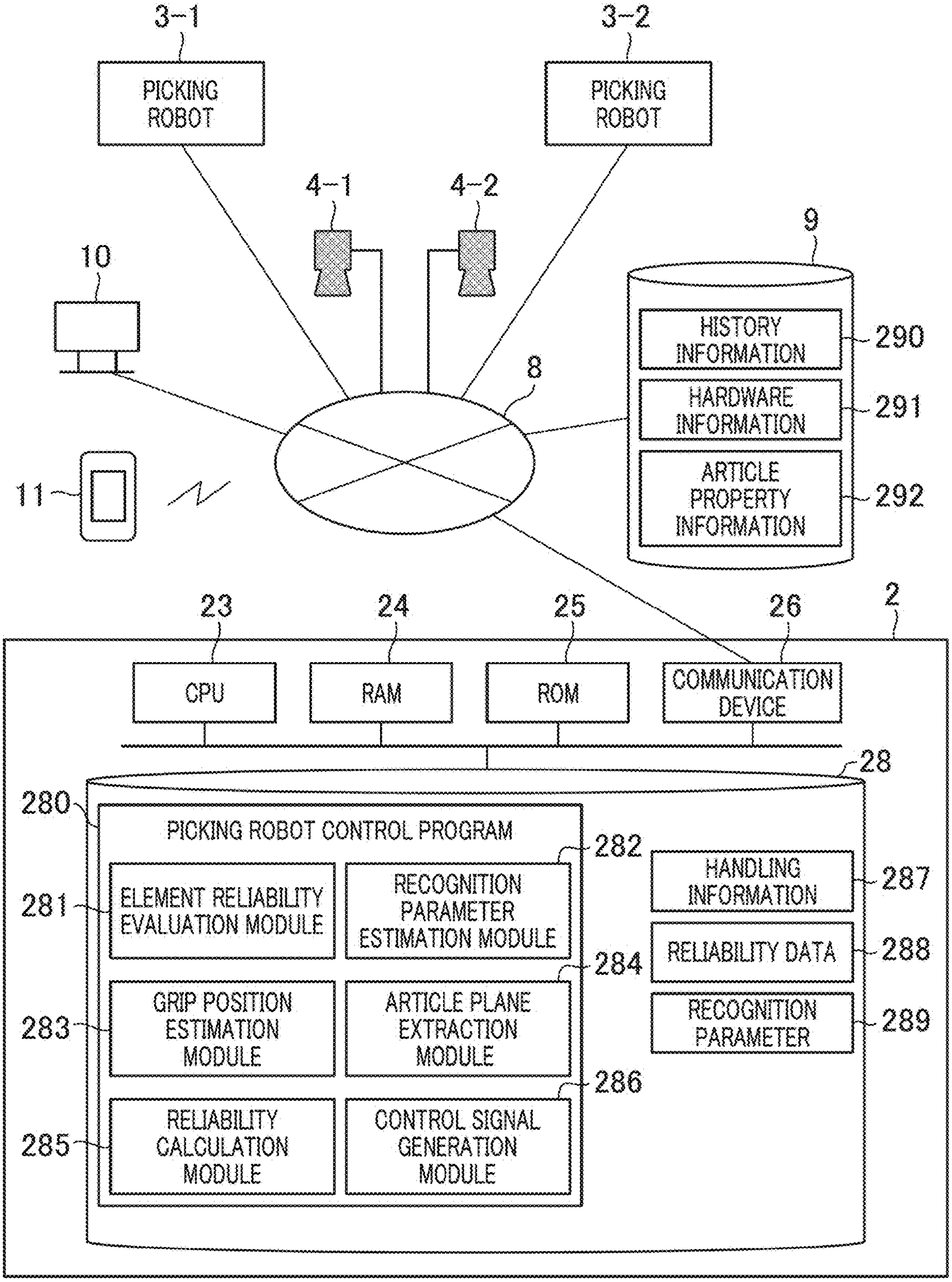
FIG. 13 is a view illustrating a modified example of an embodiment of the present invention.

A modified example of the present embodiment will be described. FIG. 1 illustrates a single unit of the picking robot 3. However, a plurality of picking robots 3 may be employed. The display 21 and the input device 22 may be structurally separated from the controller 2. An additional database 9 may be provided. FIG. 13 illustrates the modified example. FIG. 13 is a view illustrating a modified example of the present embodiment. In the modified example, the controller 2 is implemented by a so-called server for controlling the plurality of picking robots 3-1, 3-2. The controller 2 is connected to the picking robots 3-1, 3-2 via the channel 8. Sensors 4-1, 4-2 for picking up images of targets of the picking operations by the picking robots 3-1, 3-2 are connected to the channel 8 as well. In the modified example, a terminal device 10 and a tablet terminal 11 are employed instead of the display 21 and the input device 22. The terminal device 10 and the tablet terminal 11 can be implemented by a computer to be operated by the user, for example, PCs, tablets, smartphones, and the like. The screen 2100 as illustrated in FIGS. 10 and 11 is displayed on those devices.

Referring to FIG. 13, the database 9 accumulates the history information 290, the hardware information 291, and the article property information 292. The information to be output from the controller 2 is not limited to the above-identified information. The information may be accumulated in the controller 2 by omitting the database 9.

The present embodiment and the modified example may be configured to change the handling information 287 in response to the change instruction given to the change instruction input unit 206. In this case, the change instruction input unit receives the change instructions given to the input device 22, and those given to the terminal device 10 and the tablet terminal 11 via the communication device 26 so that the information is changed.

The handling information 287 may be changed by using the information from the sensor 4, for example, a visual sensor, for grasping circumstances of the picking source and the place destination (picking destination). The handling information 287 may further be changed by using the information from the system that entirely manages the site where the picking robot 3 is operated. The operation site can be exemplified by the warehouse utilizing such system as a WCS (Warehouse Control System).

This is the end of description of the modified example. The present invention, however, is not limited to the modified example and the embodiment as described above.

For example, the controller 2 may be implemented by hardware such as a dedicated communication circuit.

LIST OF REFERENCE SIGNS

1: picking system, 2: controller, 20: main body, 21: display, 22: input device, 201: input section, 202: image data input unit, 203: article property information input unit, 204: handling information input unit, 205: hardware information input unit, 206: change instruction input unit, 207: element reliability evaluation unit, 208: recognition parameter estimation unit, 209: grip position estimation unit, 210: article plane extraction unit, 211: reliability calculation unit, 212: control signal generation unit, 213: output section, 214: grip position output unit, 215: display data output unit, 216: storage section, 3: picking robot, 4: sensor, 5: pick source container, 6: pick destination container, 7: article, 8: channel, 9: database

The invention claimed is:

1. A picking system that performs an operation for picking an article as a picking target, comprising:

a picking robot that grips and moves the article; and a controller configured to control the picking robot, wherein:

the controller comprises at least one processor configured to:

receive image data of the article acquired by a sensor;

evaluate, for each of a plurality of positions in the image data, a plurality of element reliability degrees each indicating an index of ability of the picking robot to grip the article for a corresponding physical element of the article;

receive handling information indicating a handling condition relating to movement and gripping of the article, the handling condition including a time taken from activation of the picking robot to start of movement of the picking robot;

estimate, based on the handling information, a recognition parameter comprising a weighting parameter indicating an importance given to each of the plurality of element reliability degrees;

calculate, for each of the plurality of positions, an article reliability degree indicating ability of the picking robot to grip the article by integrating the plurality of element reliability degrees using the recognition parameter;

estimate, as the grip position, a position among the plurality of positions based on the article reliability degree; and output a control signal including the estimated grip position to the picking robot; and the picking robot is operated using the grip position estimated by the controller.

2. The picking system according to claim 1, wherein the handling information further indicates at least one additional handling condition selected from among collision of the article during movement with an object, time taken from gripping the article to placing the article, moving speed or acceleration during movement, and accuracy of a position of the article after movement.

3. The picking system according to claim 1, wherein the at least one processor is configured to calculate the recognition parameter by a predetermined calculation formula using, as a variable, a degree of the handling condition indicated by the handling information.

4. The picking system according to claim 1, wherein:

the at least one processor is configured to estimate, as the grip position, a position having a highest article reliability degree among the plurality of positions.

5. The picking system according to claim 1, wherein:

the at least one processor is further configured to receive article property information relating to a property of the article; and the at least one processor is configured to estimate a value of the recognition parameter based on the handling information and the article property information.

6. The picking system according to claim 1, wherein:

the at least one processor is further configured to receive hardware information relating to hardware constituting the picking robot; and the at least one processor is configured to estimate a value of the recognition parameter based on the handling information and the hardware information.

7. The picking system according to claim 1, further comprising:

a database configured to accumulate history information indicating whether the handling condition has been satisfied in past operations for gripping and moving the article, wherein the at least one processor is further configured to change the handling information based on the history information.

8. The picking system according to claim 7, wherein the at least one processor is further configured to receive a change instruction of the handling information, and to change the handling information in accordance with the change instruction.

* * * * *